July 5, 1955  G. HERZOG ET AL  2,712,609
SURVEYING BY DETECTION OF RADIATION
Filed March 24, 1950    7 Sheets-Sheet 1

INVENTORS
GERHARD HERZOG
ARTHUR H. LORD, JR.
BY EVAN PANCAKE
Daniel Stryker
J. H. Grahame
ATTORNEYS July 5, 1955  G. HERZOG ET AL  2,712,609
SURVEYING BY DETECTION OF RADIATION
Filed March 24, 1950  7 Sheets-Sheet 2

INVENTORS
GERHARD HERZOG
ARTHUR H. LORD, JR.
EVAN PANCAKE
BY Daniel Stryker
J. H. Grahame
ATTORNEYS

INVENTORS
GERHARD HERZOG
ARTHUR H. LORD, JR.
EVAN PANCAKE
BY Daniel Stryker
J. H. Grahame
ATTORNEYS July 5, 1955

G. HERZOG ET AL 2,712,609

SURVEYING BY DETECTION OF RADIATION

Filed March 24, 1950

INVENTORS
GERHARD HERZOG
ARTHUR H. LORD, JR.
BY EVAN PANCAKE
Daniel Stryker
J. H. Graflame
ATTORNEYS

United States Patent Office 2,712,609
Patented July 5, 1955

2,712,609

SURVEYING BY DETECTION OF RADIATION

Gerhard Herzog and Arthur H. Lord, Jr., Houston, and Evan Pancake, Bellaire, Tex., assignors to The Texas Company, New York, N. Y., a corporation of Delaware Application March 24, 1950, Serial No. 151,662

13 Claims. (Cl. 250—83.6)

This invention relates to the surveying of earth formations and earth surfaces by methods wherein one or more radiation detectors are used.

Up to the present time in radioactivity surveying such, for example, as in the logging of bore holes or wells in exploring for oil, it has been the practice to pass a detector such as a gamma ray detector through the hole and to record the output thereof as a log or curve showing the intensities of radiation entering the bore hole from the surrounding formations. Assuming that the detector is of the current pulse producing type, the amplified pulses are integrated in well known manner and recorded as a continuous curve.

Such integration may be accomplished with a relatively long time constant or time delay (integration circuit resolving power) in which case a comparatively smooth curve will result due to the more complete averaging of the statistical fluctuations. The transition from one intensity value to another is necessarily broadened, changes on the log occur more slowly, and there may be such a lag that the detector may traverse several feet in the hole before the full value is indicated in the log. If a thin formation is traversed, the true value of the intensity may never be determined since sharp peaks and lows are not recorded with their full amplitude.

If the integration be accomplished with an integration circuit having a relatively short time constant, changes on the log will appear in a shorter time, that is the breaks on the log will appear to be much more abrupt. At the same time, thin formations will be recorded with substantially their full intensity values. The disadvantage of this type of log is that the statistical fluctuations appearing thereon are more pronounced and are frequently difficult to distinguish from the changes it is desired to record.

Obviously, the information available from such a survey should be put to the best use possible. To do this, at least two logs of different time constants are desired. Such logs can be secured by simultaneously integrating the pulses by means of integrating circuits of different time constants as disclosed in the copending application of Gerhard Herzog, Serial No. 715,204, filed December 10, 1946, now U. S. Patent 2,458,596, issued January 11, 1949. In such case, the pulses are fed into two such circuits and two logs obtained. However, the time constants to be used must be previously decided upon. Once committed and the recordings made, integration at any other time constant that may be desirable is impossible.

It has also been proposed to use a plurality of detectors for such surveys, each detector being connected to an integrating circuit, each integrating circuit being based on a different time constant. This system has the disadvantage that a number of detectors are required with additional supplementary apparatus.

In any case, where one or a number of integrations are made directly from the detectors in the fields, the apparatus required is delicate, extensive and complex. It is difficult to handle on surface surveys, both lateral and vertical and on aerial surveys, especially those that may be made in remote areas. Furthermore, additional skilled personnel are required on such surveys.

The present invention has as its major object the elimination of the necessity for integrating in the field or on the spot where the survey is actually made and provides novel methods and apparatus wherein the instrumentation and technical operation thereof in the field are minimized. At the same time, means is provided whereby the integration may be accomplished at a period subsequent to the actual field work and under conditions where as many integrations as desired under selected and different time constants and other predetermined conditions can be made. Thus, if it is found that certain time constants provide final curves of little value, the pulses may be integrated with more favorable time constants.

A further object of the invention is the provision of novel methods and apparatus whereby the pulses received from a plurality of detectors, displaced with respect to one another in the course of their travel over formations or surfaces, may be permanently recorded in a form whereby the pulses can be integrated subsequently and under more favorable conditions at any desired time constant and with corrections for the original displacements of the individual detectors.

Another object of the invention is the playing back of such records under conditions such that the range or sensitivity setting (expansion of trace) can be predetermined and selected as desired.

Further objects of the invention will appear from the following description and claims taken in connection with the attached drawings wherein:

In its broader aspect, the invention may be said to involve the recording of pulses from a detector used in a survey of the radioactivity type in a manner such that the pulses are synchronized with the traveled surfaces or formations on a permanent record and made available for subsequent reproduction as pulses which may be processed by being integrated with different time constants to then control a log recorder with different range settings for controlling the magnitudes of the excursions of the writing pen, or may be subjected to any other form of analysis that may be found desirable in preparing worthwhile logs.

The invention contemplates the use of one or more detectors. In the latter case the pulses from the detectors can be separately recorded and later integrated as desired with any necessary correction in time displacement because of the physical displacement of the detectors in the original survey.

The invention can best be illustrated by reference to the embodiments hereinafter described which are understood to be solely by way of illustration and not limiting of the invention as the latter may be practiced in a number of different ways.

Figure 1:
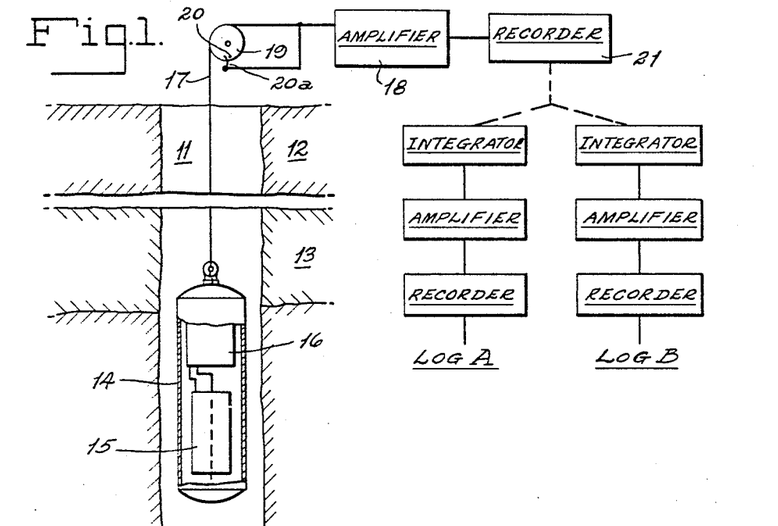
Fig. 1 is a diagrammatic showing of a single detector operating in a bore hole with the necessary recording apparatus and subsequent integrating apparatus.

Referring to Fig. 1, a well or bore hole 11 is shown traversing a series of formations 12 and 13. A housing 14 is provided to contain a detector 15 of the pulse producing type and a preamplifier 16. Detector 15 may be of the conventional Geiger-Mueller type or may be of the improved and more sensitive type disclosed in Patent No. 2,397,071, to D. G. C. Hare, issued March 19, 1946.

Housing 14 is supported from the surface by a cable 17 which also carries necessary power connections to detector 15 and the pulses from preamplifier 16 to the surface where the pulses are fed into a suitable amplifier 18. Since this type of apparatus is well known in the art, detailed description thereof is considered unnecessary.

Cable 17 is arranged to pass over a measuring device such as measuring wheel 19 so that the depth or position of housing 14 in bore hole 11 can be determined at any time and that position synchronized or related to the pulses received from the detector whereby the location of the particular formations being surveyed can be determined.

Amplifier 18 is connected to a recorder 21, through circuits hereinafter described. This recorder is preferably of the so-called magnetic type, i. e., a type in which a magnetic recording medium is utilized to record fluctuations in current and accordingly records in permanent form the pulses received from detector 15. To enable the record to be subsequently related back to the formations traversed by the detector, measuring wheel 19 is preferably provided with means whereby at certain positions thereof, pulses therefrom are communicated to recorder 21. A pin 20 on the wheel arranged to engage a contact 20a connected into the recording circuit as shown can be used for this purpose. Thus, the pulses from the measuring wheel can be subsequently related to the detector pulses and the radiation at any particular point in bore hole 11 quickly determined.

The apparatus thus far described is ordinarily the only apparatus that would be required in a field survey conducted in accordance with the teaching of the present invention. Assuming that a record has been made on a magnetic recorder 21, the record which is substantially permanent in character may be preserved and subsequently resolved in an integrating circuit usually consisting of an amplifier, an integrator and a recorder capable of making curves such as those shown in Fig. 2. In such a circuit the pulses fed therein may be integrated on the basis of different time constants or range settings (the extent of the deflection of the recording pen for a given change in counting rate). Thus, curves of almost any desired type can be secured.

Figure 2:
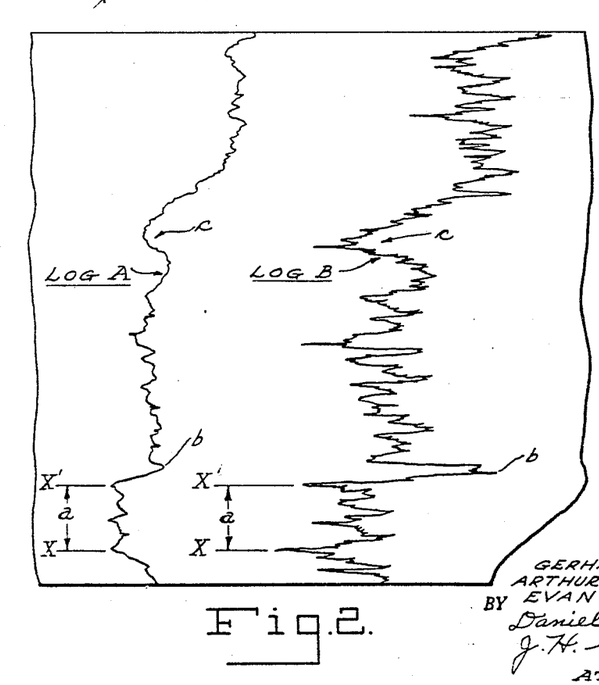
Fig. 2 represents a pair of curves made by using two integration circuits having different time constants.

Assuming that it is desired to record with a relatively long time constant and a relatively short time constant, records of the type shown in Fig. 2 will be obtained.

In Fig. 2, log A represents an actual log based on a long time constant of the order of 4 seconds. It will be observed that log A is fairly smooth and that it provides a general picture of the intensities of the formations surrounding the bore hole. Log B is based on a relatively short time constant of the order of 0.5 second.

Due to the short time constant, this log exhibits sharp breaks wherever changes in the formations occur and shows larger statistical fluctuations than log A. Log B is of value in locating more exactly the interface between adjacent formations and also in indicating the intensities of thin formations such as formation 13 of Fig. 1 at their full values.

As an example of differences in these logs, attention is called to the portions a thereof bounded by the lines x and x'. The portions show a low intensity characteristic which persists from x to x'. Points b of each log show a substantial increase in intensity for a short period of time. Points c resemble portions a to some degree but indicate a constantly changing intensity. It will be noted on log A that point c represents a decidedly gradual change but on log B it represents a definite and deep trough. Log B is definitely sharper throughout than log A.

It is to be understood that the curves in Fig. 2 represent only two of the possible curves that can be made from the one recording. Obviously the same record can be integrated with a number of different time constants and an equal number of curves obtained, all of which may be used in analyzing the survey.

It is also to be noted that this method has the advantage that the operator is not committed to predetermined time constants or range settings but is able at any time after the survey to integrate at any one or more desired time constants and range settings or any combination thereof.

Figure 3:
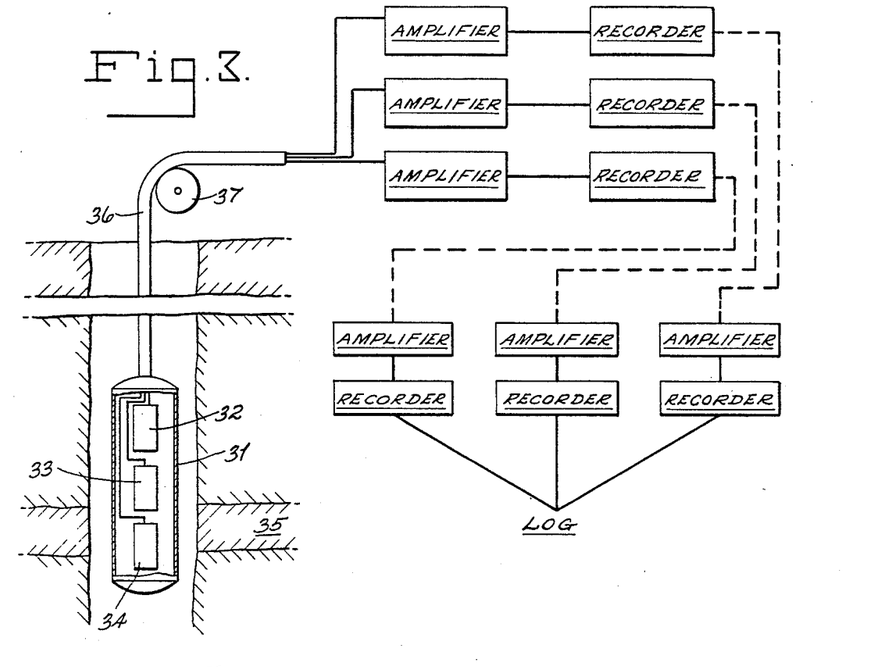
Fig. 3 is a view similar to that of Fig. 1 showing an arrangement wherein a plurality of detectors are used in a bore hole.

Fig. 3 illustrates another application of the invention wherein a housing 31 containing spaced individual detectors 32, 33 and 34 is passed through a bore hole in which it is assumed that the wall material is homogeneous except for a single thin stratum 35 to be detected. In order to have adequate resolving power, the individual detectors, which may be of the conventional Geiger-Mueller type or the improved Hare type, heretofore referred to, are somewhat shorter than the stratum is thick.

Figure 4:
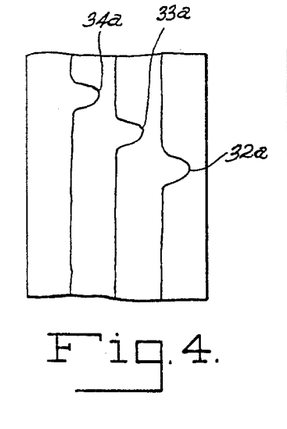
Fig. 4 illustrates a portion of a curve that would be secured from the detectors of Fig. 3 providing no correction is made as to displacement.

Assuming that the housing with the three spaced detectors is connected through amplification means, not shown, to the surface by a cable 36 passing over a measuring device such as measuring wheel 37 and the conductors from the detectors run respectively to different amplifying and integration mechanisms, a record is obtained such as that shown in Fig. 4 wherein detector 33 is opposite the stratum to be detected and produces a peak trace 33a on the record. Detector 32 has already passed the stratum 35 in the normally upward travel of the housing and results in a displaced peak 32a on the record. Similarly detector 34 which has yet to reach stratum 35 will produce a peak 34a on the record. Thus, the peak produced by each detector is shifted or displaced on the record by distances proportional to the vertical distances or displacements of the detectors in housing 31.

While a record of the type shown in Fig. 4 is useful, a combined record of the several peaks is more useful and reliable since in combining the records, natural statistical fluctuations in the radiation are compensated to the end that the combined record is a more accurate indication of the stratum being surveyed than any of the three individual peaks.

The present invention provides means whereby not only can the pulses from the detectors be integrated with any desired time constants or range setting but also provides means whereby the displacements noted in Fig. 4 corresponding to the relative positions of the individual detectors in housing 31 can be corrected. As shown in Fig. 3, the leads from each of the detectors are taken off through separate amplifiers to separate recorders wherein permanent records of the pulses received from each detector are recorded on a magnetic medium such as wire or tape. These records are made in synchronism with pulses recorded from measuring wheel 37 in the manner shown in Fig. 1 so that the pulses as recorded magnetically can be correlated with the traversed formations.

Figure 5:
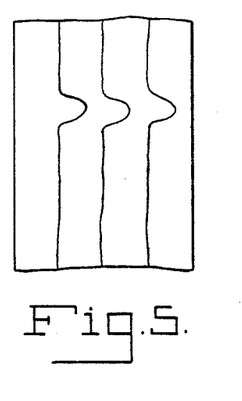
Fig. 5 is a view similar to that of Fig. 4 except that the pulses from the detectors have been corrected for displacement.
Figure 6:
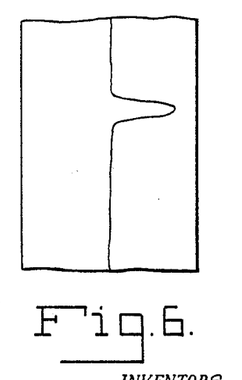
Fig. 6 corresponds to Fig. 5 except that the several curves have been combined in a single curve.

The magnetic records can then be removed to the laboratory or more convenient spot for analysis and individually amplified and recorded as shown in Fig. 3. The resultant log, assuming that in the course of integration, the displacements of the respective detectors have been corrected, can be obtained in the form shown in Fig. 5 with the peaks in horizontal alignment or a log of the type shown in Fig. 6 may be obtained wherein the single curve represents a combination of the curves obtained from the integrated pulses of the individual detectors.

This may be accomplished by use of a multiple trace galvanometer and a photographic arrangement disclosed in the copending application of Gerhard Herzog, Serial No. 704,463, filed October 19, 1946, and which matured on May 2, 1950 as U. S. Patent No. 2,506,149.

It is to be understood that by varying the time constant or range setting in any of the aforementioned integrations, different types of curves can be obtained.

In view of the character of the pulses received from the detector or detectors through the preamplifying system, it is desirable to change the characteristics of the pulses to some extent to enable both better recording and subsequent play back. One satisfactory arrangement employs a 60 microsecond pulse width with a pulse which has been altered so that it approximates closely one-half of a sine wave. By extreme damping of the recording head while recording the pulses, the inductive effect can be reduced sufficiently to limit the width of the played-back pulse to approximately 130 microseconds. The use of an electronic scale with a scaling factor of 4 increases the time spacing sufficiently to allow the recording of pulses representing average detector output rates as high as 2000/sec. or higher with substantially no loss.

Figure 7A:
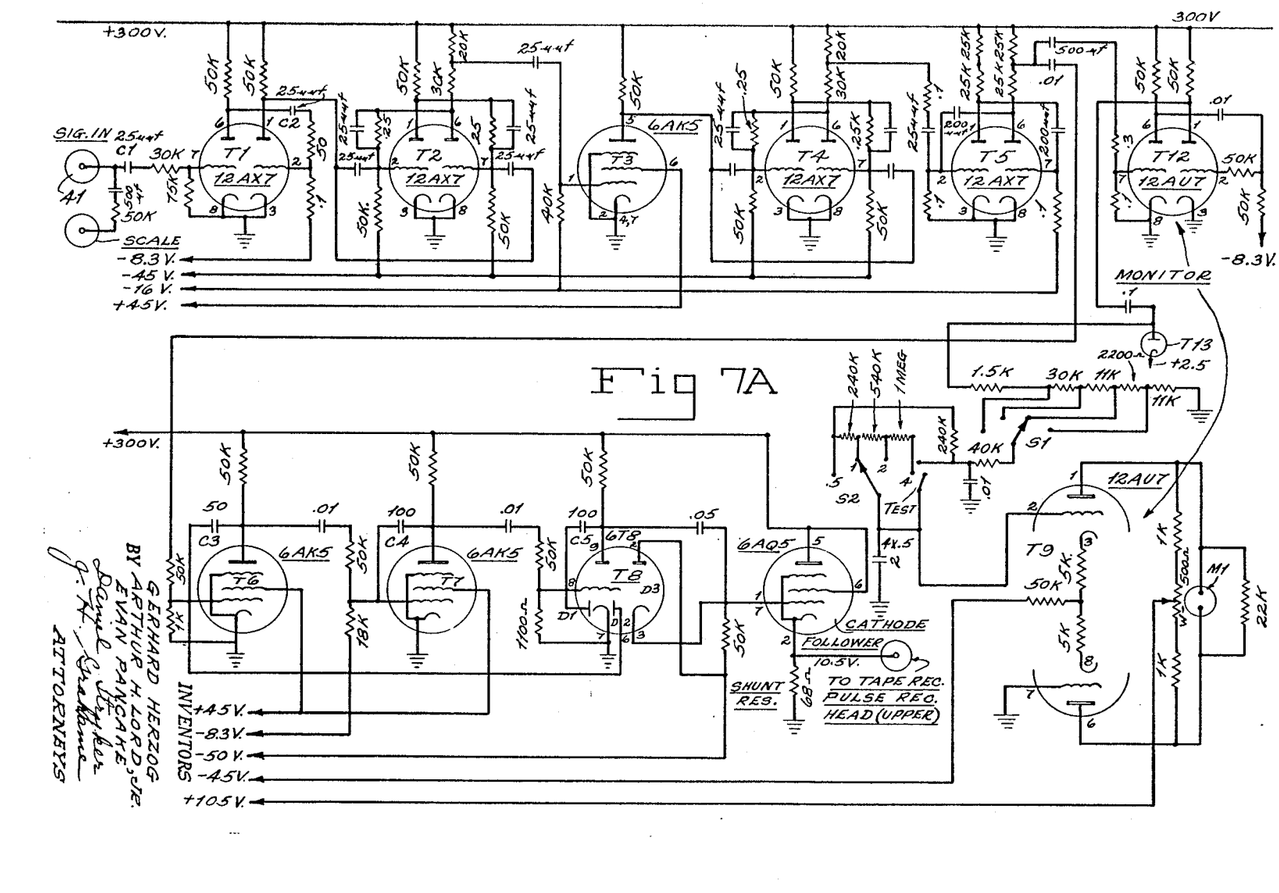
Figs. 7A and 7B represent a wiring diagram showing preferred circuitry for modifying the pulses received from the detector prior to their recording as on a magnetic recorder.
Figure 7B:
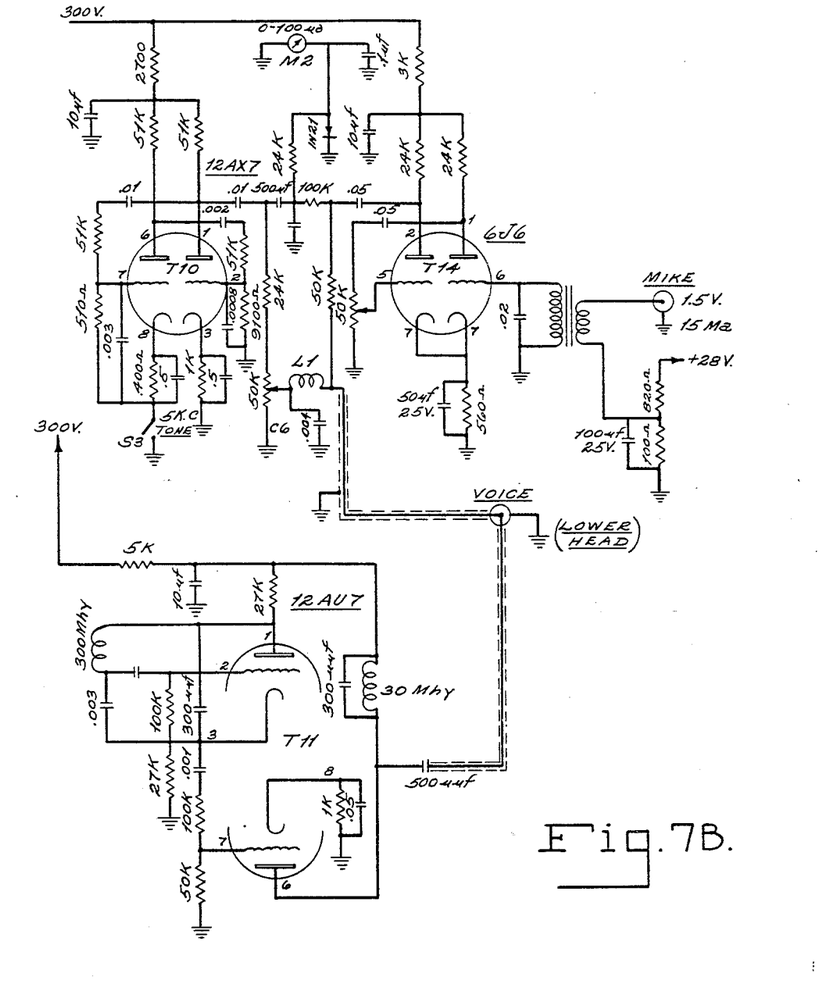

Attention is called to the circuit shown in Figures 7A and 7B wherein the various elements are identified in the figure.

Assuming that pulses are taken from a number of detectors, six for example, the pulses are passed from the detectors through a six-channel pre-amplifier and mixer unit which comprises six separate quenching circuits and preamplifiers, all operating into a common mixing stage. Obviously, such an arrangement results in completely random distribution of pulses in which the spacing between individual pulses can be from any value of time down to coincidence. Since the upper frequency response of the conventional tape recorder for sine waves is 15,000 cycles per second or less, and since, therefore, it cannot record pulses which are very short and/or have such high repetition rates that their sine wave components extend well beyond this upper limit of 15,000 cycles per second or less, it is desirable to increase the time spacing of the pulses to avoid loss of pulses which may be closely spaced or partially superimposed in time. A simple expedient for this purpose is the conventional "flip-flop" type scaling circuit. For the detector output rates ordinarily encountered in actual oil field operations, i. e., rates which are generally no higher than 1800–2000 per second, the use of a scaling factor of four in a scaling circuit connected between the detector and the recording system is capable of reducing the loss of pulses due to close spacing to substantially less than one-half of 1%. In other words it is feasible to record between 450 and 500 pulses per second in a recorder having the above-mentioned upper frequency limit.

The scaling circuit with its scaling factor of 4 operates most efficiently at high rates if it is driven or triggered by a fairly short duration pulse, i. e., of the order of 5 microseconds' duration.

Referring to Figures 7A and 7B, incoming pulses having durations of about 40 microseconds are received at 41. Differentiation of these pulses is accomplished in coupling condensers C1 and C2 in the two-triode amplifier stages of tube T1. The resulting 5 microsecond pulse is used to drive or trigger the first scale of two, T2. The next stage, T3, the de-coupling or buffer stage, drives the second scale of two, T4, with the pulse received from the output of T2. Due to the upper frequency limit of the magnetic recording system, the short duration pulses at the output of T4 must be broadened to approximately 55 microseconds' duration. This is accomplished in the multi-vibrator trigger circuit T5.

Since the output of T5 is a nearly rectangular pulse with an exponential decay and since any departure from a sine wave characteristic in the inductive recording head of the magnetic recorder will result in both loss of efficiency and tendency toward multiple pulses, it is necessary to alter the wave form of the pulses to an approximation of one-half of a sine wave. This is accomplished by the inverse feedback provided by condensers C3, C4 and C5 in tube stages T6, T7 and T8. Care must be exercised in each of the last-mentioned stages to avoid swinging the control grid beyond the linear portion of its characteristic curve as this would result in additional distortion of the type these stages are designed to eliminate.

The shorting diodes D1, D2 and D3 function to eliminate the backwave which is introduced by the coupling condensers. This is essential to maintain the unidirectional character of the pulses.

In order to avoid the "tailing out" of each pulse due to an inductive effect characteristic of the recording head, it is preferred to employ a very high degree of damping by means of shunt resistance across the head.

By reason of the resulting low impedance and the undesirable features of transformer or condenser coupling, it is preferred to employ a cathode follower for driving the head.

It is desirable to obtain linear recording characteristics. This can be accomplished by the addition of high-frequency excitation. Since the low impedance of the described circuit would require the dissipation of a relatively large amount of power in the high-frequency excitation source, and would lead to a cancelling effect in cathode follower T9 on each negative half cycle of the high frequency, it has been found more satisfactory to record on untreated tape with a fairly large signal, i. e., 10 volts, peak. While this results in a substantially broader pulse when played back, of the order of 130 microseconds, because of the increased spacing in time obtained by the use of a scale of four, the losses remain negligible for pulse occurrence rates as high as 2000 per second as measured at the mixing stage ahead of the scale of four.

The apparatus necessary for the requisite power supply has been omitted from the drawings since it is generally conventional in character. Suffice to say, it provides the different types of power necessary for operation.

The pulse monitor circuit shown in Fig. 7A includes pulse-shaping and control tubes T12 and T13, a sensitivity or range control S1 which is adjusted to obtain the desired range on the meter for any given range of intensities encountered, a time delay control S2 which determines the resolving power of the integration circuit, a balanced bridge type vacuum tube volt-meter circuit T9, and a monitor meter M1 which is a 0–100 microammeter. Readings observed on this meter may be interpreted in average observed counts per second by the use of suitable calibration curves.

Referring to both Figs. 7A and 7B, the type 12A x 7 vacuum tube T10 is used as a 5 kc. tone oscillator. Closing of switch S3, which is preferably of the push-button type causes this circuit to operate and to apply a marker tone such as a 5 kc. tone on the voice edge of the magnetic tape when desired. Switch S3 may be arranged to be actuated by the switch assembly 20 and 20a on measuring wheel 19 or the two switch assemblies may be placed in parallel so that revolutions of the measuring wheel will be recorded on the tape. Thus, a positive means of marking the tape for purposes of correlation with time, depth, linear distance and any topographic features desired to be recorded orally is provided.

The marker tone is applied to the recording head of the recorder through filter L1–C6 to prevent cross modulation of the two oscillators T10 and T11. The oscillator T11 provides 50 kc. biasing frequency for the voice and tone recording head.

The type 6J6 dual triode T14 (Fig. 7B) is a two-stage voice amplifier which applies the operator's oral commentary onto the voice and tone recording head. Meter M2 provides visual monitoring of both voice and marker tone. It should be noted that none of the variable settings in the pulse monitor circuit can in any way affect or alter the characteristics of the magnetic pulse recording. Since the individual pulses are recorded, these are affected only by the fixed scaling factor of 4 provided in the main pulse amplifier circuit.

Figure 8A:
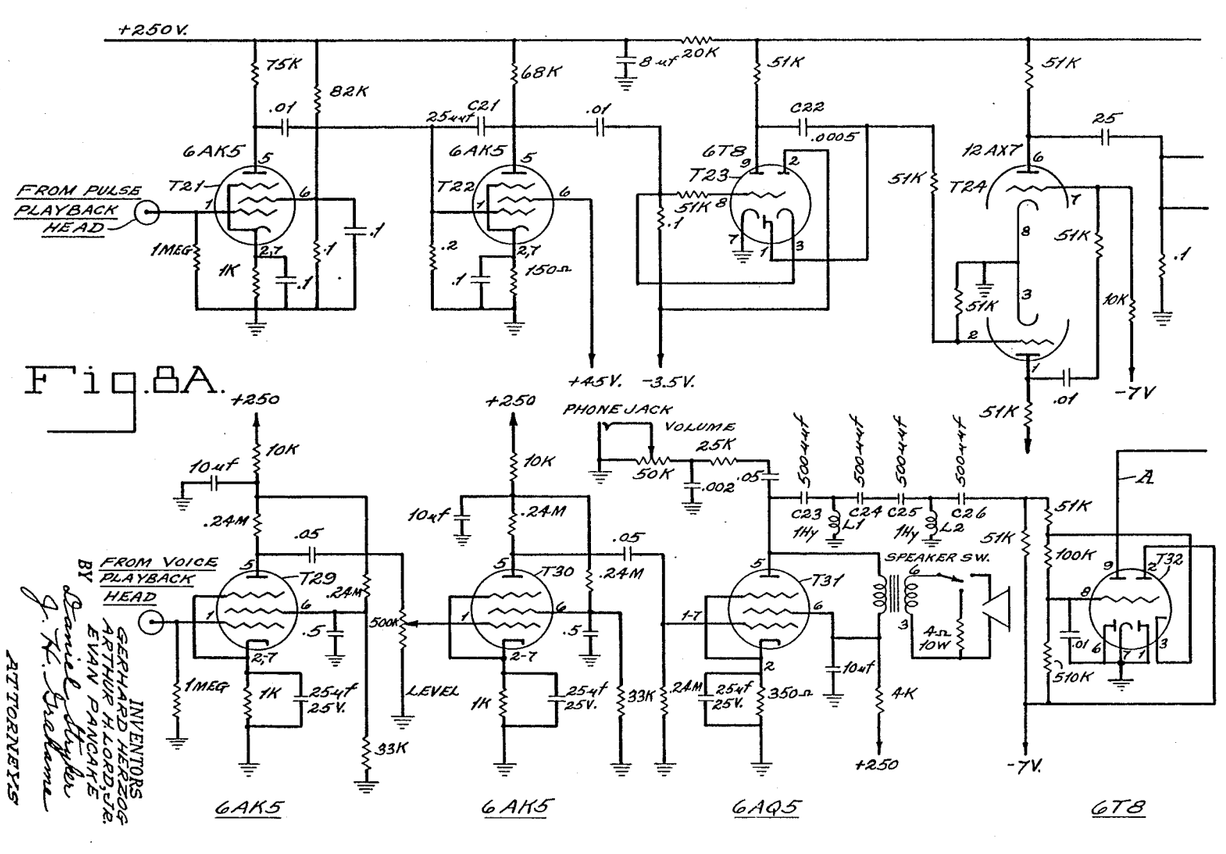
Figs. 8A and 8B represent a play back circuit.
Figure 8B:
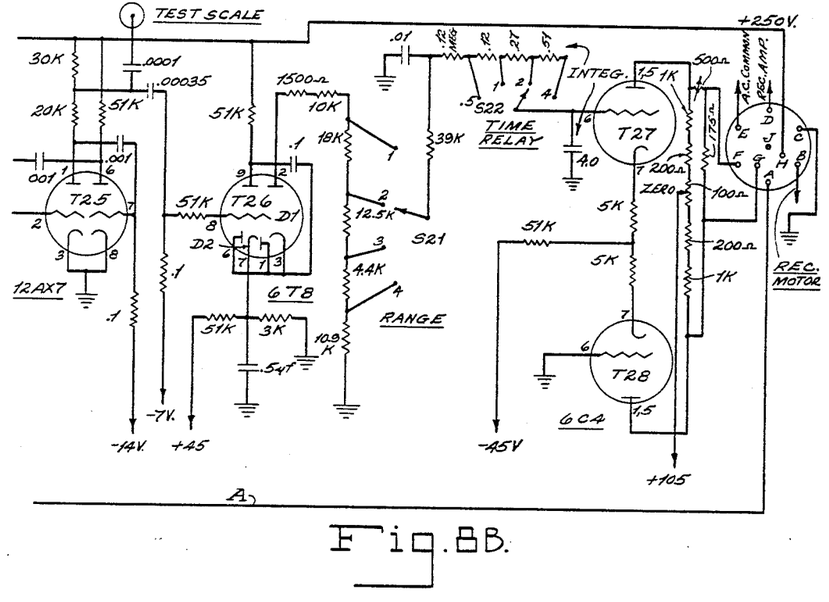

Figs. 8A and 8B show a schematic diagram of the "play back" unit. As with Figs. 7A and 7B, the showing of the power supply has been omitted.

A pulse play back amplifier, starting with tube T21 and continuing through tubes T27 and T28 is shown across the top halves of the figures. Stages T21 and T22 comprise a high gain voltage amplifier with a small amount of stabilizing inverse feed back through a condenser C21. In stage T23, the 3.5 volt negative bias eliminates the excessively broad pulse base which results from the combined effects of record and play back head inductive effects and tthe absence of a high frequency biasing voltage during the recording process. The resulting pulse is further reduced in width as a function of time by the differentiation obtained in coupling condenser C22. The reduction in pulse amplitude suffered in the foregoing stage is compensated by the voltage gain of dual triode amplifier T24. The output of T24 is then used to trigger the multi-vibrator type trigger circuit T25 which insures constant amplitude of pulses for the integration circuit. The output of the decoupling stage T26 is then fed to the range or sensitivity control S21 through diodes D1 and D2. The resolving power of the integration circuit designated INTEG in Fig. 8b is determined by the setting of time delay switch S22. The balanced electronic bridge circuit of tubes T27 and T28 constitutes the vacuum tube voltmeter circuit, the output of which is used to deflect the pen of the recorder. A suitable chart recorder is that sold by Leeds & Northrup under the trade name Speedomax.

Vacuum tubes T29, T30 and T31 are used for the audio frequency play back amplifier and function to amplify the oral commentary and the marker tone. Voice reproduction can be accomplished by head phones and/or a small monitor speaker.

Inductances L1 and L2 and condensers C23, C24, C25 and C26 comprise a high pass filter which rejects voice frequencies and passes the marker tone. This signal is then resolved into an average D. C. potential and applied to the control grid of tube T32. Since this voltage is positive in sign, it overcomes the 7 volt negative bias on the grid and allows tube T32 to draw plate current.

Figure 9:
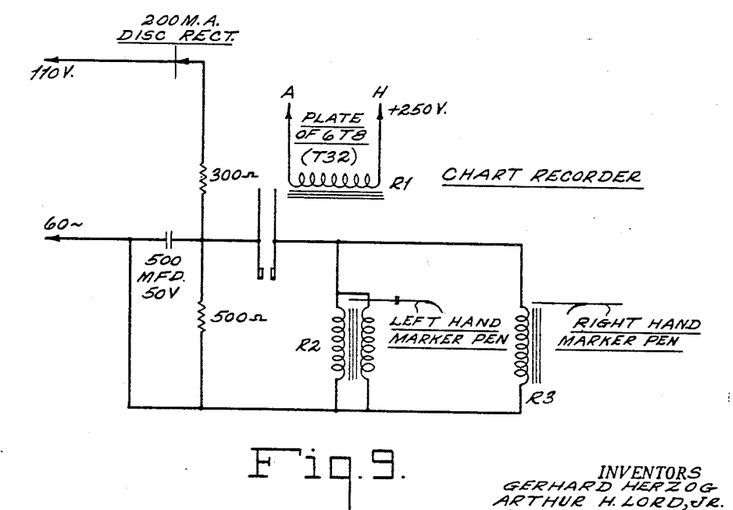
Fig. 9 represents that portion of the circuit going to the recording pens.

Referring to Fig. 9, the plate current of T32 operates relay R1 which in turn activates relays R2 and R3 which in turn mark the left-hand and the right-hand edges of the record chart.

Preferably, the chart recorder is arranged so that the moving chart paper is exposed on a flat surface outside the recorder case. This feature allows the operator to transcribe the oral commentary onto the chart as the record is being made.

Figure 10:
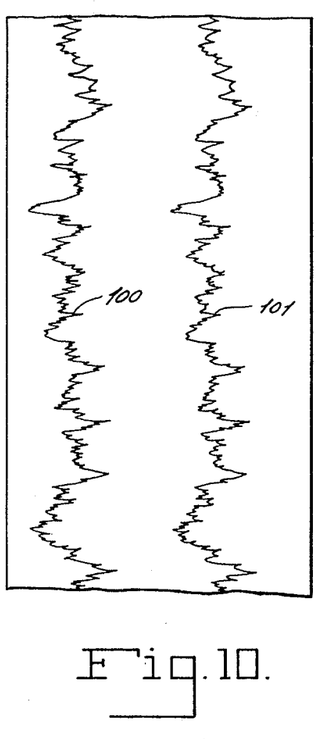
Fig. 10 is a chart comparing the results of logs made in the apparatus hitherto used, and that of the present invention.

Fig. 10 illustrates the accuracy of the reproduction obtained in practice of the present invention. In that figure, trace 100 is a recording of a signal used in making a magnetic tape recording of the background intensity at a certain spot on the earth's surface. The same pulses that were magnetically recorded were used to produce the deflections recorded on the trace. Trace 101 is a recording which was obtained by playing back the magnetic recording from the tape. The instrument settings of sensitivity or range (expansion of trace) and the time delay (integration circuit resolving power) were duplicated on traces 100 and 101. The nearly perfect reproduction of even the smallest intensity deviations is immediately apparent when the two traces are examined and compared.

Figure 11:
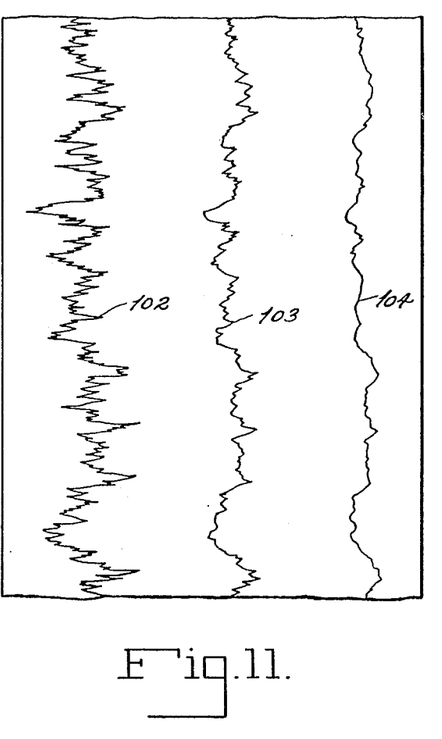
Fig. 11 is a chart showing the effect of variations in time delay.

Fig. 11 shows traces 102, 103 and 104 which are play back recordings of the same magnetic record. The range or sensitivity setting of Fig. 10 was maintained in Fig. 11, the integration time delay being varied to 0.5 second, 2 seconds and 4 seconds on traces 102, 103 and 104, respectively.

Figure 12:
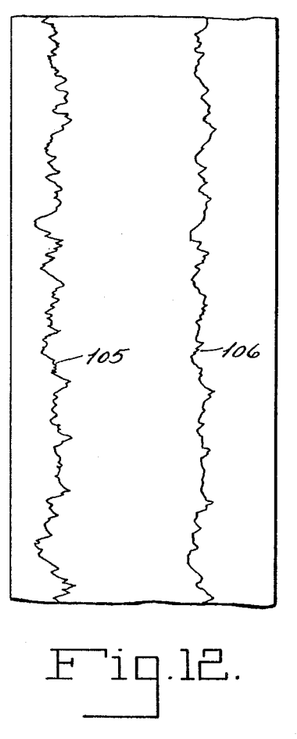
Fig. 12 is a chart showing the effect of variations in range setting.

Fig. 12 shows traces 105 and 106 which are also reproductions of the same record as traces 100 and 101 but wherein the time delay setting was the same and the range setting (expansion of trace) was changed.

These graphical results are believed to illustrate the possibilities of the invention. They show that after a set of magnetic recordings has been secured from a given area or location, the flexibility of graphic recording is practically unlimited. It is possible with the single original record to obtain a great variety of graphic recordings for various requirements of analysis and interpretation without the necessity of returning to the field location for repeat runs.

Moreover, the field apparatus and technical operations required in the field are reduced to a minimum. This is particularly important in aerial operations where weight and volume of the apparatus is a material factor and the number of operators is limited as in operations with a helicopter.

Obviously many modifications and variations of the invention, as hereinbefore set forth, may be made without departing from the spirit and scope thereof, and therefore only such limitations should be imposed as are indicated in the appended claims.

We claim:

1. Radiation detection apparatus comprising: a device for recording a train of electrical pulses, which device has a known upper-frequency limit; means responsive to nuclear radiation to produce a train of current impulses; scaling means, having its input coupled to the last-mentioned means and its output connected to the recording device, and responsive to the arrival of a group of a predetermined number of successive current impulses at its input to produce one electrical pulse at its output, whereby the scaling means will feed to the recording device a train of said electrical pulses at an average occurrence rate which is a fraction of that of the current impulses, said scaling means including means for producing the electrical pulses each to have a wave-form which varies substantially-harmonically-with-time over its duration and to have a substantial duration as compared to the average duration of the impulses to permit recording of the largest possible average number of said pulses in the recording device for its known upper-frequency limit, whereby the apparatus is capable of the maximum possible detection of intense radiation for a given scaling factor.

2. The method of surveying comprising the steps of: moving a radiation detector along a course which extends successively with respect to a number of earth formations to produce a train of pulses having a characteristic which varies with variations in radiation issuing from earth constituents at different points along the course; reproducibly recording the pulses as they are produced; and at a subsequent time reproducing the pulses as electrical signals and integrating the signals to an extent selected to produce a voltage whose variations-over-time have rates of change which are best indicative of certain potentially-significant features of said variations in radiation regardless of the speed at which the detector was moved along the course.

3. The method of surveying comprising the steps of: moving a radiation detector along a course which extends successively with respect to a number of earth formations to produce an electrical signal having a characteristic which varies with variations in radiation issuing from earth constituents at different points along the course; reproducibly recording the signal as it is produced; and at a subsequent time reproducing the signal and integrating it to different extents each selected to produce a voltage whose variations-over-time have rates of changes which are best indicative of certain potentially-significant features of said variations in radiation for respective different regions along said course.

4. The method of surveying comprising the steps of: moving a radiation detector along a course which extends successively with respect to a number of earth formations to produce a train of pulses having a characteristic which varies with variations in radiation issuing from earth constituents at different points along the course; scaling down the number of pulses in said train to produce submultiple pulses representing successively occuring groups thereof; reproducibly recording the sub-multiple pulses; and at a subsequent time reproducing the sub-multiple pulses as electrical signals and integrating the signals to an extent selected to produce a voltage whose variations-over-time have rates of change which are best indicative of certain potentially-significant features of said variations in radiation regardless of the speed at which the detector was moved along the course.

5. The method set forth in claim 4 in which the sub-multiple pulses are produced to have a duration which is greater than the average duration of the pulses in said train produced by the detector and is related to the most probable occurrence rate of the sub-multiple pulses to optimize, for the upper frequency limit of apparatus to be used for the recording, the rate at which they can be recorded.

6. The method set forth in claim 3 which further comprises the step of using the last-mentioned voltage to produce along a reference scale on a visual record an indication representative of said variations in radiation along the course.

7. The method set forth in claim 2 in which the pulses are recorded on an elongated magnetizable medium and marker signals are also recorded on portions thereof as reproducible references representative of positions along said course.

8. The method set forth in claim 7 in which the voltage last mentioned in claim 2 is used to produce a visual record of said variations in radiation along the course and said references are reproduced and used to produce visual marks on said record representative of said positions.

9. The method set forth in claim 3 in which said signal is recorded on an elongated magnetizable medium and oral commentaries are recorded on portions thereof representative of different ones of said points along the course; said voltage last mentioned in claim 3 is used to produce on a visual record representations of said variations in radiation along the course and said commentaries are reproduced and used to produce visual transcriptions on said record.

10. The method set forth in claim 3 comprising the additional steps of moving another detector along said course while maintaining between it and said first-mentioned detector a predetermined spacing in a direction along said course to produce a second electrical signal also having a characteristic which varies like that of the first-mentioned electrical signal; also reproducibly recording the second electrical signal as it is produced and reproducing and integrating it at said subsequent time; and combining the integrated signals thus obtained.

11. The method set forth in claim 10 in which one of said electrical signals is suitably delayed before the integrated voltage derived from it is combined with that derived from the other so that for the spacing between the two detector and the speed at which they are moved along the course corresponding ones of said variations over time which are indicative of features of the detected variations in radiation will be combined in phase.

12. The method of surveying comprising the steps of: moving a radiation detector along a course which extends successively with respect to a number of earth formations to produce a train of pulses having a characteristic which varies with variations in radiation issuing from earth constituents at different points along the course; differentiating said pulses to reduce their durations; scaling down the differentiated pulses to produce sub-multiple pulses representative of groups thereof; differentiating the sub-multiple pulses to produce trigger pulses; using the trigger pulses to produce an equal number of pulses having an appropriate average duration for their most probable average occurrence rate to comprise a predetermined spectrum of components; reproducibly recording the last-mentioned pulses in an electrical recording device having a suitable pass band for passing a substantial part of said spectrum of components; at a subsequent time reproducing the recorded pulses and integrating them to an extent selected to produce a voltage whose variations over time have rates of change which are best indicative of certain potentially significant features of said variations in radiation regardless of the speed at which the detector was moved along the course.

13. Electrical apparatus comprising means for reproducing a succession of electrical pulses from an externally derived record thereof, means for integrating the reproduced pulses with any one of a number of different time constants; and means for producing on a visual record a representation of the variations in the signal produced by integrating the pulses.

References Cited in the file of this patent

UNITED STATES PATENTS

| | | |
|---|---|---|
| 2,441,065 | Green | May 4, 1948 |
| 2,458,596 | Herzog | Jan. 11, 1949 |
| 2,479,518 | Scherbatskoy | Aug. 16, 1949 |
| 2,506,149 | Herzog | May 2, 1950 |
| 2,508,772 | Pontecorvo | May 23, 1950 |
| 2,543,532 | Neufeld | Feb. 27, 1951 |